US008911524B1

(12) United States Patent
Cavanaugh et al.

(10) Patent No.: US 8,911,524 B1
(45) Date of Patent: Dec. 16, 2014

(54) COMPOSITION AND METHOD TO INCREASE PHOSPHORUS UPTAKE IN PLANTS

(71) Applicants: Kevin Cavanaugh, Collierville, TN (US); Timothy B. Cartwright, Germantown, TN (US)

(72) Inventors: Kevin Cavanaugh, Collierville, TN (US); Timothy B. Cartwright, Germantown, TN (US)

(73) Assignee: Floratine Products Group, Inc, Collierville, TN (US)

( * ) Notice: Subject to any disclaimer, the term of this patent is extended or adjusted under 35 U.S.C. 154(b) by 98 days.

(21) Appl. No.: 13/769,484

(22) Filed: Feb. 18, 2013

Related U.S. Application Data

(60) Provisional application No. 61/613,199, filed on Mar. 20, 2012.

(51) Int. Cl.
C05D 9/02 (2006.01)
C05F 11/00 (2006.01)
C05B 15/00 (2006.01)

(52) U.S. Cl.
CPC .................... *C05B 15/00* (2013.01)
USPC .......................................................... 71/11

(58) Field of Classification Search
CPC ...................................... C05B 15/00
See application file for complete search history.

(56) References Cited

U.S. PATENT DOCUMENTS

| 6,911,210 B1* | 6/2005 | Bormann et al. | 424/401 |
| 2003/0133985 A1* | 7/2003 | Louie-Helm et al. | 424/486 |
| 2004/0076690 A1* | 4/2004 | Ikemoto et al. | 424/729 |
| 2005/0085454 A1* | 4/2005 | Ghosal | 514/185 |
| 2007/0274971 A1* | 11/2007 | Meakin et al. | 424/93.21 |

FOREIGN PATENT DOCUMENTS

| CN | 1602684 A | * | 4/2005 | |
| JP | 2000229827 A | * | 8/2000 | A61K 7/42 |
| JP | 2005304323 A | * | 11/2005 | A23L 2/00 |

OTHER PUBLICATIONS

DailMed—Guna Llver, Drug Label Information, Mar. 2010.*
Unbound Energy Drink + Juice pp. 1-2 Nov. 20, 2008.*

* cited by examiner

*Primary Examiner* — Jennifer A Smith
(74) *Attorney, Agent, or Firm* — Harris, Shelton, Hanover & Walsh; Susan B. Fentress

(57) ABSTRACT

The present invention provides a composition and method to increase phosphorus uptake in plants. This can be accomplished by mining phosphorus both in the free and bound state from the soil solution surrounding the roots of a plant. The process of mining involves the release of phosphorus from the bound state and the solubilization of unbound phosphorus to facilitate uptake by the roots of a plant. The mining of phosphorus can be accomplished by providing a phosphorus solubilizing compound having: i) at least one natural root acid; ii) at least one vitamin and iii) at least one crystalline carbohydrate, to a portion of a plant. The phosphorus solubilizing compound can be applied to plants to extract available phosphorus from the soil. This product can be either a soluble liquid or a solid.

4 Claims, 2 Drawing Sheets

COMPOSITION AND METHOD TO INCREASE PHOSPHORUS UPTAKE IN PLANTS

CROSS-REFERENCE TO RELATED APPLICATIONS

This application claims the benefit of U.S. Ser. No. 61/613,199 filed Mar. 20, 2012 under 35 U.S.C. §119(e), hereby specifically incorporated by reference.

STATEMENT RE: FEDERALLY SPONSORED RESEARCH/DEVELOPMENT

Not applicable

FIELD OF THE INVENTION

This invention relates to compositions that can mine the soil for phosphorus and reduce the need for the addition of synthetic granular fertilizers.

BACKGROUND OF THE INVENTION

In order to maintain healthy growth, plants must extract a variety of elements from the soil. In terms of the quantity of nutrients needed, the "basic nutrients," carbon, hydrogen and oxygen are the largest. Nitrogen, phosphorus and potassium are in the group known as the "primary nutrients" and are needed in the second largest quantity. However, in recent years, many states have become concerned about the water pollution caused by the "run-off" of excessively applied fertilizers, particularly nitrogen and phosphorus.

Of this group, phosphorus plays the key role in providing energy to the respiration cycle of the plant. No other element can replace phosphorus in this crucial role for plant life. Unfortunately, phosphorus is extremely reactive and forms very strong bonds with all metallic elements in the soil. This means it has limited availability for root uptake and nature has developed several mechanisms for releasing phosphorus from the soil. The two most effective mechanisms for phosphorus release involve 1) microbial activity and 2) root exudates. These two mechanisms are symbiotic and work in concert to maximize phosphorus availability. The relationship between microbes and roots is unbelievably complicated and synergistic. Roots can exude compounds that encourage specific microbe populations, capture specific nutrients, kill pathogens, and repel insects. Microbes, for their part, excrete plant biostimulants, fight off pathogens, and release nutrients from minerals and organic matter. In view of environmental regulations, a need exists in the industry for compositions that can mine the soil for phosphorus and reduce the need for synthetic granular fertilizers.

SUMMARY OF THE INVENTION

Given the need in the industry, it is an object of the present invention to provide a phosphorus solubilizing compound made of at least one natural root acid, at least one organic acid and at least one crystalline carbohydrate. It is another object of this invention to provide a phosphorus mining composition made of a soluble blend of at least one natural root acid, at least one vitamin, and at least one crystalline carbohydrate, wherein said at least one crystalline carbohydrate is inositol.

In another embodiment, this invention provides a phosphorus mining composition made by the process including the steps of: blending of at least one natural root acid, at least one a vitamin, and at least one crystalline carbohydrate, wherein said at least one crystalline carbohydrate is inositol in the presence of a compatibility agent selected from the group consisting of: chemicals with —OH groups and —NH2 amino acids to aid in the solubility of the composition.

In another embodiment, a method to increase phosphorus uptake in plants is to provide including the steps of: providing a sufficient amount of a phosphorus solubilizing composition to a portion of a plant or adjacent to a portion of a plant to increase free soil phosphorus wherein said phosphorus solubilizing composition consists essentially of a soluble blend of at least one natural root acid, at least one vitamin, and at least one crystalline carbohydrate, wherein said at least one crystalline carbohydrate is inositol.

BRIEF DESCRIPTION OF THE SEVERAL VIEWS OF THE DRAWINGS

For a fuller understanding of the nature and desired objects of the present invention, reference is made to the following detailed description taken in conjunction with the accompanying drawing figures.

DETAILED DESCRIPTION OF THE INVENTION

Figure 1:
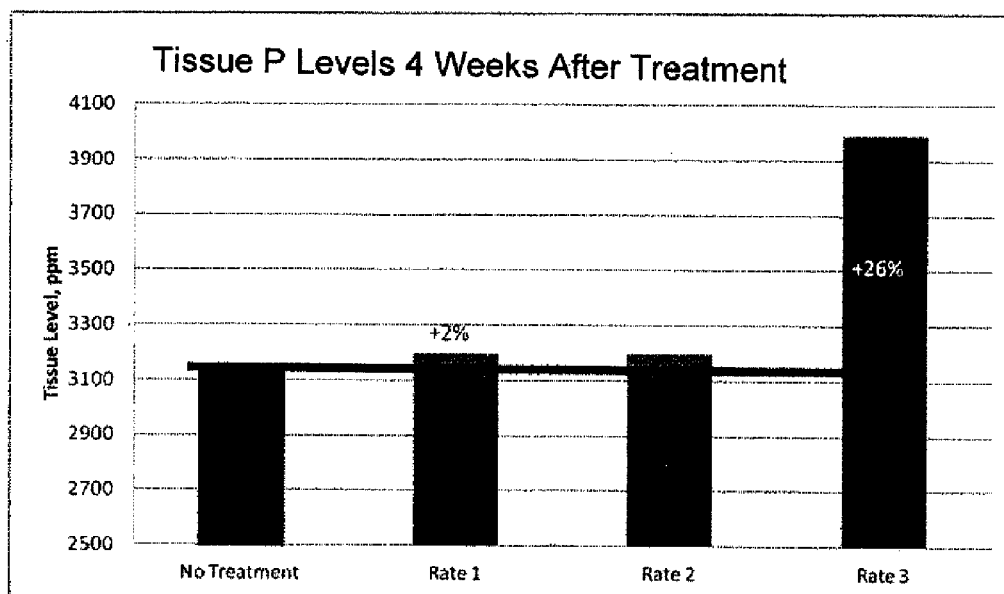
FIG. 1 shows tissue phosphorus levels after four weeks of treatment with a composition of the present invention.

The present invention may be understood more readily by reference to the following detailed description of the invention. It is to be understood that this invention is not limited to the specific devices, methods, conditions or parameters described herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The present invention provides a method to increase phosphorus uptake in plants. This can be accomplished by mining phosphorus both in the free and bound state from the soil solution surrounding the roots of a plant. The process of mining involves the release of phosphorus from the bound state and the solubilization of unbound phosphorus to facilitate uptake by the roots of a plant. The mining of phosphorus can be accomplished by providing a phosphorus solubilizing compound having: i) at least one natural root acid; ii) at least one vitamin and iii) at least one crystalline carbohydrate, to a portion of a plant. The phosphorus solubilizing compound can be applied to plants to extract available phosphorus from the soil. This product can be either a soluble liquid or a solid.

The art of the invention relates to the successful incorporation of multiple combinations of the natural exudates and excretions, into soil applied product that can extract available phosphorus from the soil. The functions of the root acids can be classified in three main categories: 1) chelation or capturing of nutrients, 2) providing food for "beneficial microbes" and 3) repulsion or poisoning of pathogens and insects. Root acids include:

| Exuded Root Acid |
| --- |
| Acetic |
| Formic |
| Oxalic |
| Hydrocyanic |
| Malic |
| Citric |
| Aspartic |
| Gluconic |
| Pimelic |
| Succinic |
| Tartaric |
| Fumaric |
| Glycolic |
| Piscidic |
| Aldonic |
| Valeric |
| Aconitic |
| Lactic |
| Pyruvic |
| Glutaric |
| Malonic |
| Erythronic |
| Tetronic |

One of the plant's top priorities of the plant is to insure a supply of phosphorus to drive energy needs and bolster the respiration cycle. Citric acid and malic acid together comprise over 95% of the total root exudates. However, there are several of these acids that focus only on the release of phosphorus, namely, citric, fumaric, glycolic, piscidic, aldonic, and malonic. In the present invention, at least one of citric, fumaric, glycolic, and aldonic acid are preferred.

In addition to the root acids above, the plant can and will exude the full array of 23 amino acids, 12 different enzymes, 6 different sugars, 3 different alcohols, 4 different aldehydes, and 3 different flavanoids. However, the total of all these (plus the 21 root acids without the citric and malic) make up only 5% of the exudate load. These root exudates act both directly and indirectly on the microbes in the soil to optimize the processing of minerals and enhance the microbial excretions. In the mycchorizae, beneficial microbes excrete many different compounds aimed at keeping the plant healthy.

Here is a summary of a few of those compounds:

| Compound |
| --- |
| Thiamine (Vitamin B1) |
| Riboflavin (vitamin B2) |
| Nicotinic acid (vitamin P) |
| Folic acid (vitamin B9) |
| Ascorbic acid (Vitamin C) |
| Vitamin B6 |
| Biotin (vitamin H) |
| Pantothenic acid (vitamin B5) |
| Carotene (vitamin A) |
| Tocophoryl (vitamin E) |
| Vitamin K |
| Amino acids |
| Inositol |
| Auxins |
| Glutaric acid |
| Formic acid |
| Valeric acid |

As with the root exudates, there are several of these excretions that are related to the release and use of phosphorus. These include: riboflavin (vitamin B2), folic acid (vitamin B9) and pantothenic acid (vitamin B5).

Crystalline carbohydrate are sugars that that are soluble in water. In particular, inositol binds with phosphate ion for transport through the roots and throughout the plant.

The incorporation of these exudates and excretions into a soil applied product enhances the natural release of plant-available phosphorus and eliminates the need for the synthetically produced phosphorus fertilizers. This product can be either a soluble liquid or a dry powder. Both forms have their advantages and disadvantages.

The liquid version of the product provides a much quicker response to plant growth. The soluble constituents can penetrate the soil and enter the root zone as it is applied and watered in. However, solubility of several of the constituents is low and the successful blending of these ingredients is part of the art. Riboflavin, for example, is nearly insoluble in water, but is completely soluble in isopropyl alcohol. Pantothenic acid is slightly soluble in water, but is completely soluble in methylethylamine.

The successful blending of the final product then requires the addition of chemicals with —OH groups and —NH2 amino acids to aid in the solubility of the overall product. Examples of chemicals providing solubilization with an —OH groups are differing molecular weights of polyethylene oxide, polyethylene glycol (PEG) and polypropylene glycol (PPG). Additionally, examples of —NH2 amino acids that aid in the solubility of the overall product include amino acid blends that are made of leather collagen and/or keratin. It is these type of compounds that are considered "Compatibility Agents."

A typical product blend can contain components in these ranges:

| Raw Material | Weight % Range |
| --- | --- |
| Water | 40-87 |
| Inositol | 10-20 |
| Citric Acid | 2-10 |
| Fumaric Acid | 0-4 |
| Malonic Acid | 0-4 |
| Glycolic Acid | 0-4 |
| Humic Acid | 0-4 |
| Aldonic Acid | 0-4 |
| Riboflavin | 0-2 |
| Folic Acid | 0-2 |
| Pantothenic Acid | 0-2 |
| Compatibility Agent | 1-5 |

In another embodiment, a dry powder version is used. The dry powder version is much easier to blend since the solubility issues have been removed. However, the final product must be easily slurried without the build-up of clumps or precipitates. Part of the art is the incorporation of dispersion aids to insure a properly slurried product. A typical range of recipes can be see in the following table:

| Raw Material | Weight % Range |
| --- | --- |
| Inositol | 10-20 |
| Citric Acid | 5-15 |
| Fumaric Acid | 0-6 |
| Malonic Acid | 0-6 |
| Glycolic Acid | 0-6 |
| Aldonic Acid | 0-6 |
| Humic Acid | 0-6 |
| Riboflavin | 0-4 |

-continued

| Raw Material | Weight % Range |
|---|---|
| Folic Acid | 0-4 |
| Pantothenic Acid | 0-4 |
| Dispersion Agent | 25-85 |

The "Dispersion Agent" is required to prevent caking and clumping during the dissolving process. Quick dispersion of the ingredients while adding water is required to minimize any form of agglomeration and aid in the solubility. Examples of dispersion agents include humic acid, starch and/or glucoheptose.

EXAMPLE 1

Lab Batch Test

A lab batch was prepared using several organic acids to release the phosphorus and sugars to chelate and transport the nutrient. A simple experiment was performed to test the phosphorus releasing capabilities of the composition of the invention.

The trial batch was powder placed in 1-gallon jugs. Water was then added to the jug to dissolve the product. There were no issues dissolving the composition of the present invention. Two different dosages were applied to a small soil plug in the lab. Samples of each run were then sent to Harris for evaluation. The beginning phosphorus content in the soil was 8 ppm. The results, in Table 1, show that the product increases the availability of several key nutrients in the soil—including phosphorus.

TABLE 1

| Nutrient content, meq/l | No treatment | Run 1 | Run 2 | % Increase |
|---|---|---|---|---|
| Phosphorus | 0.14 | 0.19 | 0.17 | 28.6 |
| Sulfate | 0.96 | 2.19 | 1.59 | 96.8 |
| Manganese | 0.09 | 1.01 | 1.16 | 1100.0 |
| Iron | 1.03 | 2.32 | 2.35 | 227.0 |
| Calcium | 0.84 | 1.01 | 0.95 | 16.7 |
| Silicate | 3.49 | 6.2 | 6.4 | 80.0 |

EXAMPLE 2

Evaluate the Ability of a Phosphorus Solubilizing Compound to Maintain a Greater Pool of Plant-Available Phosphorus for Turf-Grass Uptake The experiment was conducted at the Auburn University Plant Science Research Center (PSRC) greenhouse facility, located on the Auburn campus. A Decatur soil (fine, kaolinitic, thermic Rhodic Paleudult with a high phosphorus fixing capability (via Al/Fe sesquioxides)) was used for the experiments. An initial soil test result revealed a soil pH of 6.0, soil P (Mehlich) of 11 pounds per acre (Very Low), soil K of 253 pounds per acre (Very High) and soil magnesium, and calcium of 300 and 1715 pounds per acre, respectively.

The experiment design was a 5×3 factorial of phosphorus rate and phosphorus solubilizing materials. Phosphorus rates were 0, 30, 60 and 90 pounds $P_2O_5$ per acre, mixed with the soil surface (top one inch) in a one-time addition as triple super phosphate (TSP) (0-45-0). Phosphorus rates were combined with one of three solubilizing materials: 1) none, 2) composition of the present invention (at three rates, labeled, 2× and 4×), and, 3) AVAIL (Southern States, Inc). One of the goals of the experiment is to determine the optimum dosage for phosphorus release.

The composition of the present invention was applied at three rates, which were 0.1 gram per pot, 0.2 grams per pot and 0.4 grams product per plot. This corresponded to the labeled rate, and 2× and 4× that labeled rate.

The test was arranged in a complete (without phosphorus fertilizer) factorial design of 4 phosphorus rates×4 phosphorus solubilizers, for a total of 16 treatments in the study. Each treatment was replicated 3 times. Destructive sampling of the study was performed (3 times, at weeks 4, 8 and 12 after fertilization) there were 144 pots in each test. The entire experiment was repeated twice.

An experiment unit (pot) was four inches in diameter and six inches high, with each pot filled to within one inch of the rim with the ground and sieved soil. The same weight of soil was placed in each pot. Pots were watered to prevent water leaching from the bottom of each pot. All pots were watered to maintain soil water status at around 80% below field capacity.

Phosphorus fertilizer rates were determined for each treatment, and that phosphorus (as TSP) was mixed in the top one inch of soil. The composition of the present invention was added by mixing each amount with a small amount of water (20 mL) and poring that on the soil in each pot. The same amount of water was applied to every pot. Twenty seeds of 'Marshall' annual ryegrass were seeded in the top of each pot, and lightly watered until emergence. Once the experiment was initiated all pots were watered with a phosphorus deficient Hoaglands solution to supply $1/10^{th}$ pound of N per 1,000 square feet per week.

| Table of Activities: | | | |
|---|---|---|---|
| Date | Activity-Run 1 | Date | Activity-Run 2 |
| Jan. 13, 2011 | Initiated Experiment | Feb. 17, 2011 | Initiated Experiment |
| Jan 31 | Fertilized with Hoaglands | Feb 28 | Fertilized with Hoaglands |
| Feb 9 | Week 4 Harvest | Mar 7 | Fertilized with Hoaglands |
| Feb 14 | Fertilized with Hoaglands | Mar 14 | Fertilized with Hoaglands |
| Feb 21 | Fertilized with Hoaglands | Mar 16 | Week 4 Harvest |
| Feb 28 | Fertilized with Hoaglands | Mar 21 | Fertilized with Hoaglands |
| Mar 7 | Fertilized with Hoaglands | Mar 28 | Fertilized with Hoaglands Harvested extra tissue (week 6) |
| Mar 9 | Week 8 Harvest | April 4 | Fertilized with Hoaglands |
| Mar 14 | Fertilized with Hoaglands | April 11 | Fertilized with Hoaglands |
| Mar 21 | Fertilized with Hoaglands | April 12 | Week 8 Harvest |
| Mar 28 | Fertilized with Hoaglands | April 18 | Fertilized with Hoaglands |
| April 4 | Fertilized with Hoaglands | April 25 | Fertilized with Hoaglands |
| April 6 | Week 12 Harvest | May 2 | Fertilized with Hoaglands |
| | | May 9 | Week 12 Harvest |

Data collection involved dry weight of harvested ryegrass roots and top-growth (3 separate measurements), performed as destructive harvests at weeks 4, 8 and 12. At each sampling the plants were removed and roots and shoots (top-growth) separated, washed, dried and weighed. Soil samples were collected for subsequent extraction (described below). In Run 2 top-growth was sufficient that an additional harvest was needed at Week 6. This top-growth was also analyzed for phosphorus content. At this time the plants were merely clipped, and a destructive harvest was not done. Tissue phosphorus content of top-growth using standard dry combustion and analysis techniques. Tissue phosphorus was determined via Inductively Coupled Plasma Spectrometry (ICP) soil phosphorus availability as extracted with: 1) $CaCl_2$ (labile phosphorus), and, 3) Mehlich-I extractant (SE standard soil test extractant for phosphorus). Phosphorus was determined using standard Molybdate-blue color techniques.

Figure 2:
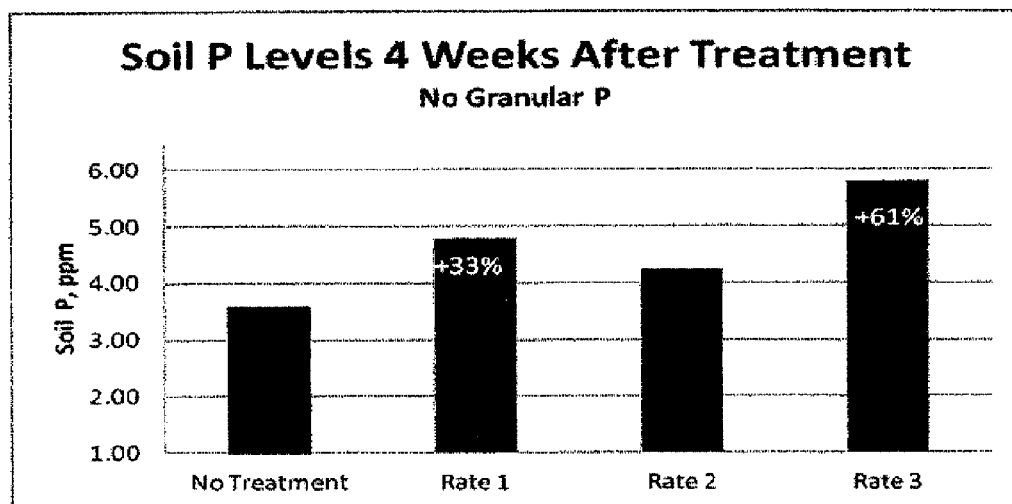
FIG. 2 shows soil phosphorus levels four weeks after treatment with no granular Phosphorus.

The most spectacular results from the trial revealed an increase of up to a 26% increase in tissue levels and a 61% increase in the free soil phosphorus without the supplement of phosphorus fertilizers as shown in FIGS. 1 and 2.

These and other aspects, features and advantages of the invention will be understood with reference to the detailed description herein, and will be realized by means of the various elements and combinations particularly pointed out in the appended claims. It is to be understood that both the foregoing general description and the following detailed description of the invention are exemplary and explanatory of preferred embodiments of the invention, and are not restrictive of the invention, as claimed.

The invention claimed is:

1. A composition in a weight percent range consisting essentially of: inositol 10-20; citric acid 5-15; fumaric acid 0-6; malonic acid 0-6; glycolic acid 0-6; aldonic acid 0-6; humic acid 0-6; riboflavin 0-4; folic acid 0-4; pantothenic acid 0-4; and a dispersion agent 25-85.

2. A composition in a weight percent range consisting essentially of: water 40-87; inositol 10-20; citric acid 2-10; fumaric acid 0-4; malonic acid 0-4; glycolic acid 0-4; humic acid 0-4; aldonic acid 0-4; riboflavin 0-2; folic acid 0-2; pantothenic acid 0-2; and a compatibility agent 1-5.

3. A product made by the process comprising: blending i) at least one natural root acid, ii) at least one organic acid, iii) at least one vitamin, iv) at least one crystalline carbohydrate, and v) water to form a product, wherein the step of blending occurs in an aqueous solution to form a homogeneous solution and said product is in a weight percent range consisting essentially of: water 40-87; inositol 10-20; citric acid 2-10; fumaric acid 0-4; malonic acid 0-4; glycolic acid 0-4; humic acid 0-4; aldonic acid 0-4; riboflavin 0-2; folic acid 0-2; pantothenic acid 0-2; and a compatibility agent 1-5.

4. A product made by the process comprising: blending i) at least one natural root acid, ii) at least one organic acid, iii) at least one vitamin, and iv) at least one crystalline carbohydrate, to form a product in a weight percent range consisting essentially of: inositol 10-20; citric acid 5-15; fumaric acid 0-6; malonic acid 0-6; glycolic acid 0-6; aldonic acid 0-6; humic acid 0-6; riboflavin 0-4; folic acid 0-4; pantothenic acid 0-4; and a dispersion agent 25-85.

* * * * *